United States Patent [19]
LeConey et al.

[11] Patent Number: 5,914,456
[45] Date of Patent: Jun. 22, 1999

[54] ADSORBENT PACKET FOR AIR CONDITIONING ACCUMULATORS

[75] Inventors: Douglas E. LeConey, Clayton; Raymond B. Wood, Brookville, both of Ohio

[73] Assignee: Stanhope Products Company

[21] Appl. No.: 08/956,217

[22] Filed: Oct. 22, 1997

Related U.S. Application Data

[63] Continuation of application No. 08/633,434, Apr. 17, 1996, Pat. No. 5,837,039.

[51] Int. Cl.⁶ .................................................. B01D 53/04
[52] U.S. Cl. .............................. 96/121; 62/503; 96/135; 96/136; 96/147; 96/153; 210/282
[58] Field of Search ........................ 62/474, 503; 96/108, 96/121, 135, 136, 147, 153, 154; 210/266, 282, DIG. 6

[56] References Cited

U.S. PATENT DOCUMENTS

| | | | |
|---|---|---|---|
| 1,439,151 | 12/1922 | Dailey et al. ......................... 55/518 X |
| 1,657,927 | 1/1928 | Heinzen ............................... 220/506 X |
| 1,776,558 | 9/1930 | Herman . |
| 1,973,717 | 9/1934 | Kessenich ............................ 220/506 X |
| 2,139,792 | 12/1938 | Bechaud ............................... 220/506 X |
| 2,148,770 | 2/1939 | Mittendorf ............................... 210/131 |
| 2,181,511 | 11/1939 | Domoto .................................... 220/20 |
| 2,210,862 | 8/1940 | Tronstad ................................... 96/154 |
| 2,325,657 | 8/1943 | Burkness ................................. 210/134 |
| 2,334,840 | 11/1943 | Punton et al. ............................ 96/136 |
| 2,482,779 | 9/1949 | Katz ........................................ 126/263 |
| 2,557,557 | 6/1951 | Newcum ................................. 210/131 |
| 2,589,229 | 3/1952 | Dauphinee ................................. 183/4 |
| 2,600,435 | 6/1952 | Shapiro ................................. 210/131 |
| 2,626,678 | 1/1953 | Yant ......................................... 183/44 |
| 2,661,870 | 12/1953 | Huenergardt ............................ 222/129 |
| 2,761,527 | 9/1956 | Dreznes ................................... 183/44 |
| 2,887,117 | 5/1959 | Rosholt ............................... 220/306 X |
| 3,071,800 | 1/1963 | Patriquin ............................. 220/306 X |
| 3,212,416 | 10/1965 | Boersma ............................... 220/352 X |
| 3,221,478 | 12/1965 | Norton .................................... 55/281 |
| 3,262,599 | 7/1966 | Muller .................................... 220/307 |
| 3,360,156 | 12/1967 | Bohlman ................................ 220/306 |
| 3,469,696 | 9/1969 | Petrucci et al. ........................... 210/97 |
| 3,545,227 | 12/1970 | Grahl ......................................... 62/85 |

(List continued on next page.)

FOREIGN PATENT DOCUMENTS

WO 95/26224  10/1995  WIPO .

OTHER PUBLICATIONS

Nerac "Problem Solving Report 002543.00", Dec. 7, 1993.
MACS Service Reports, "Ford's 'sump' accumulators & important changes in oil and refingerant charge", 2–96, pp. 7–8.

*Primary Examiner*—Robert Spitzer
*Attorney, Agent, or Firm*—Biebel & French

[57] ABSTRACT

An adsorbent material containing package is provided for use within the sealed canister of a liquid accumulator for an air conditioning system of the kind in which the suction tube within the canister has spaced upwardly extending legs connected by a bottom bite and in which the bleed opening in the bite is formed as a downwardly extending nipple. The adsorbent material package is formed with substantially identical first and second pouches formed of tubular porous polyester felt material with sealed upper and lower ends containing a quantity of adsorbent material. The pouches making up the package are joined to each other at upper flanges with the junction being located along an extension of a median line through the pouches and leaving the ends of the flanges free of attachment. The transverse width of the pouch flanges exceeds the spacing of the suction tube legs so that the flange end portions are splayed to receive one of the legs therebetween thereby locating the package in relation to the suction tube. The lower ends of the pouches define peripherally sealed openings which are proportioned to be received over the suction nipple for locating the lower ends of the pouches making up the package on the suction tube nipple.

2 Claims, 7 Drawing Sheets

U.S. PATENT DOCUMENTS

| | | | |
|---|---|---|---|
| 3,746,174 | 7/1973 | Watanabe | 210/282 |
| 3,796,025 | 3/1974 | Kasten | 55/316 |
| 3,799,352 | 3/1974 | McClive | 210/282 |
| 3,879,292 | 4/1975 | McClive | 210/282 |
| 3,918,578 | 11/1975 | Cullen et al. | 206/204 |
| 3,926,599 | 12/1975 | Rudin et al. | 55/387 |
| 3,951,812 | 4/1976 | Hsu | 210/282 |
| 3,961,919 | 6/1976 | Lamoreaux | 55/184 |
| 4,029,486 | 6/1977 | Frantz | 55/218 |
| 4,072,615 | 2/1978 | McConnell | 96/147 X |
| 4,116,649 | 9/1978 | Cullen et al. | 55/387 |
| 4,199,960 | 4/1980 | Adams et al. | 96/147 X |
| 4,266,408 | 5/1981 | Krause | 62/474 |
| 4,291,548 | 9/1981 | Livesay | 210/DIG. 6 |
| 4,401,447 | 8/1983 | Huber | 96/147 X |
| 4,405,347 | 9/1983 | Cullen et al. | 210/282 X |
| 4,436,623 | 3/1984 | Cullen et al. | 210/282 |
| 4,457,843 | 7/1984 | Cullen et al. | 96/108 X |
| 4,464,186 | 8/1984 | Mann | 55/387 |
| 4,464,261 | 8/1984 | Cullen et al. | 96/147 X |
| 4,474,035 | 10/1984 | Amin et al. | 62/503 |
| 4,496,378 | 1/1985 | Kish | 55/316 |
| 4,505,727 | 3/1985 | Cullen et al. | 96/147 |
| 4,509,340 | 4/1985 | Mullally et al. | 96/136 X |
| 4,548,624 | 10/1985 | Waller | 55/274 |
| 4,573,632 | 3/1986 | Scheeren | 229/2.5 R |
| 4,619,673 | 10/1986 | Cullen et al. | 96/147 |
| 4,623,368 | 11/1986 | Lancesseur | 55/387 |
| 4,683,057 | 7/1987 | Krause et al. | 210/232 |
| 4,698,164 | 10/1987 | Ellis | 210/739 |
| 4,764,274 | 8/1988 | Miller | 210/232 |
| 4,800,018 | 1/1989 | Moser | 210/266 |
| 4,835,986 | 6/1989 | Carlisle, Jr. | 62/503 |
| 4,882,052 | 11/1989 | Peranio | 210/282 |
| 4,911,739 | 3/1990 | Cullen et al. | 96/147 X |
| 4,913,942 | 4/1990 | Jick | 96/121 |
| 4,921,512 | 5/1990 | Maryyanek et al. | 55/488 |
| 4,957,521 | 9/1990 | Cullen et al. | 210/282 X |
| 4,994,185 | 2/1991 | Cullen et al. | 210/282 |
| 5,036,972 | 8/1991 | Cullen et al. | 96/108 X |
| 5,038,582 | 8/1991 | Takamatsu | 62/474 |
| 5,048,309 | 9/1991 | Carlisle, Jr. | 62/503 |
| 5,052,193 | 10/1991 | Pettitt et al. | 62/503 |
| 5,069,694 | 12/1991 | Cullen et al. | 96/154 |
| 5,119,616 | 6/1992 | Cullen et al. | 53/453 |
| 5,177,982 | 1/1993 | Plemens | 96/147 X |
| 5,179,844 | 1/1993 | Lyman et al. | 62/503 |
| 5,184,479 | 2/1993 | Koberstein et al. | 210/282 X |
| 5,184,480 | 2/1993 | Kolpacke | 62/503 |
| 5,201,792 | 4/1993 | Study | 210/282 X |
| 5,245,842 | 9/1993 | Searfoss et al. | 210/282 X |
| 5,288,469 | 2/1994 | Skalla | 422/171 |
| 5,304,235 | 4/1994 | Watanabe et al. | 96/144 |
| 5,347,829 | 9/1994 | Newman | 62/503 X |
| 5,419,157 | 5/1995 | Kiblawi et al. | 62/503 |
| 5,435,153 | 7/1995 | Hutchison et al. | 62/474 |
| 5,443,626 | 8/1995 | Kiyani | 96/108 |
| 5,503,662 | 4/1996 | Berger | 96/108 |
| 5,570,589 | 11/1996 | Petty | 62/503 X |
| 5,580,451 | 12/1996 | Tack | 96/108 X |
| 5,636,525 | 6/1997 | Riemenschneider | 96/147 X |
| 5,651,266 | 7/1997 | Hutchison et al. | 62/503 X |

ADSORBENT PACKET FOR AIR CONDITIONING ACCUMULATORS

This is a continuation of application Ser. No. 08/633,434 filed on Apr. 17, 1996, now U.S. Pat. No. 5,837,039.

BACKGROUND OF THE INVENTION

This invention relates to adsorbent packages and containers for use with liquid air conditioning accumulators and more particularly to a self-supporting double packet of adsorbent material which is retained on the filter extension of the bight of the suction tube and between the upstanding legs thereof.

Commonly, liquid accumulators for air conditioning systems, such as automotive air conditioning systems employ a sealed or closed canister which provides temporary storage for the refrigerant and the lubricating oil, and also provides for dehydration of the refrigerant. Typically, the liquid accumulator has a permanently sealed casing which includes a baffle which separates the liquid from the gas component, and also has a generally u-shaped pick up tube or suction tube with a bight portion which has a filtered bleed opening facing the container bottom. The tube also has two legs which extend upwardly toward the baffle at the top in generally, but not necessarily, parallel relationship, one end of which is open to receive an inflow of vaporized refrigerant for delivery to the suction side of the compressor by downward flow past the bottom pick up opening.

One or more desiccant packages are normally carried on or mounted on this u-shaped tube with portions extending from the filtered pick up opening upwardly along the generally parallel portions of the tube extending from the bight. The desiccant package is inserted and sealed within the accumulator prior to its permanent assembly. Such accumulators of the general kind are shown in the Livesay U.S. Pat. No. 4,291,548 of Sep. 29, 1981, and Kisch U.S. Pat. No. 4,496,378 of Jan. 29, 1985.

In the Livesay and Kisch patents, the inlet filter for the bight bleed opening is shown as an annular package which wraps around the bight at the bleed opening. In certain accumulators, this bleed opening is in the form of a downwardly extending inverted funnel-shaped nipple leading from the outer surface of the bight at the lowest point, which nipple is closed at its end by a fine filter screen.

Prior art adsorbent pouches have been made as single or double-lobed units which often fold about the underside of the bight and then have upwardly extending container portions which are secured or tied to the generally parallel tube portions as shown, for example as shown in Huber, U.S. Pat. No. 4,401,447 and Cullen et al, U.S. Pat. No. 4,911,739 of Mar. 27, 1990. In such cases, the upwardly extending pouch portions of the container must be secured in place by some auxiliary latching or retaining arrangement to prevent the pouches from slumping outwardly against the container sidewalls. It is important that the pouches of adsorbent material be maintained accurately with respect to the vertical portions of the suction tube for proper operation, and further to protect the wall material of the pouch from excess heat during the time that the metal container is assembled and the seams are brazed to form a pressure-tight vessel.

SUMMARY OF THE INVENTION

This invention is generally directed particularly to a twin pouch adsorbent package for use within liquid accumulators formed with a filtered bleed nipple at the bottom of the bight. Such an accumulator has become popular in air conditioning systems on a variety of automotive lines. These systems have required increased oil injection into the suction side of its compressors. Such accumulators comprise a small oil sump or reservoir on the accumulator bottomside adjacent the bleed nipple. The inverted funnel-shaped bleed nipple, in combination with the sump or reservoir and shaped accumulator bottom, has been found to more efficiently gather and circulate oil to the compressor than prior bleed orifices with an annular or surrounding filter. The bleed nipple is used in this invention as an adsorbent package anchor.

The essentially identical pouch portions or pouches are formed with end seams in which the porous walls of the package, preferably made of a porous polyester felt material, are fused across the width of the pouches to form fused, closed ends. The fused, closed ends are relatively stiff compared to the body of the pouches. One flanged end of one of the pouches is electronically or heat welded, at a central spot or region, to the corresponding flanged end of a second pouch so that the pair of pouches are positioned in generally side-by-side relationship. Intentionally, the remote edges of the pouch closed flanged ends are free from each other so that they may be spread apart on either side of the fused central attachment for the purpose of embracing or engaging one or the other of the upright suction tube portions of the accumulator.

The opposite or non-joined ends of the pouch pairs are similarly closed and sealed at fused lower ends. In a preferred embodiment, each lower end is perforated centrally of a median line to form an opening. The opening is peripherally sealed and proportioned to permit the respective fused lower ends to be threaded over the bleed nipple and in non-interfering relation to the filter screen.

When thus assembled, the extended marginal edges of the upper fused ends are splayed apart. The fused upper ends of the pouches have a width which exceeds the spaced apart width of the vertical suction tube portions at that region, thereby to receive at least a portion of each of the suction tube portions between the splayed spaced-apart ends. In this manner, the adsorbent package is located on the vertical rising portions of the suction tube and, at the same time, the opposite fused lower pouch ends are threaded, one on top of the other, over the bleed nipple.

The pouches are formed from a tubular strip of porous polyester felt material in which the remote ends are closed to form the top and bottom attachment ends by suitably tucking in a portion of the tube sidewall and flattening an end portion under conditions which causes the polyester fibers to fuse together and seal the ends of the tube to make a pouch. The width of the flanged end is controlled, at least on the upper ends of the pouches, to be somewhat greater than the spaced apart centers of the vertical suction tube portions of the accumulator so that, when assembled, the opposed opposite ends of the co-joined pouch tops straddle the adjacent legs of the suction tube and support the pouches in a located position when the lower ends are buttoned over the inverted funnel-shaped oil bleed nipple.

An advantage of the invention is that the pouch portions and package are retained in a positive manner without the necessity of external or auxiliary straps, tie downs, or wrap around tabs. Further, the assembly techniques required lend themselves to automation procedures.

The self-retention of the adsorbent-containing pouches assure that no part of the polyester body is in contact with the canister, thereby preventing melting or damage due to manufacturing procedures of brazing or welding the upper and lower halves of the canister to form a unitary product.

An important object of the invention is the provision of a desiccant or adsorbent pouch package which is self-holding within an accumulator by a threaded engagement over a bleed orifice nipple.

Another object of the invention is to provide a package having a pair of pouch portions which are joined to each other along fused transversely extending flange-like top edges and which major portions of the top edges are free and are proportioned to engage one or the other of a pair of upstanding suction tube or portions for stabilizing and locating the package in relation to the suction tube.

Another object of the invention is to provide an adsorbent-material package in the form of a pair of pouches which are co-joined at one end and which have opposite ends adapted to be threaded over a bleed orifice nipple.

Other objects and advantages of the invention will be apparent from the following description, the accompanying drawings, and the appended claims.

DESCRIPTION OF THE PREFERRED EMBODIMENT

Figure 1:
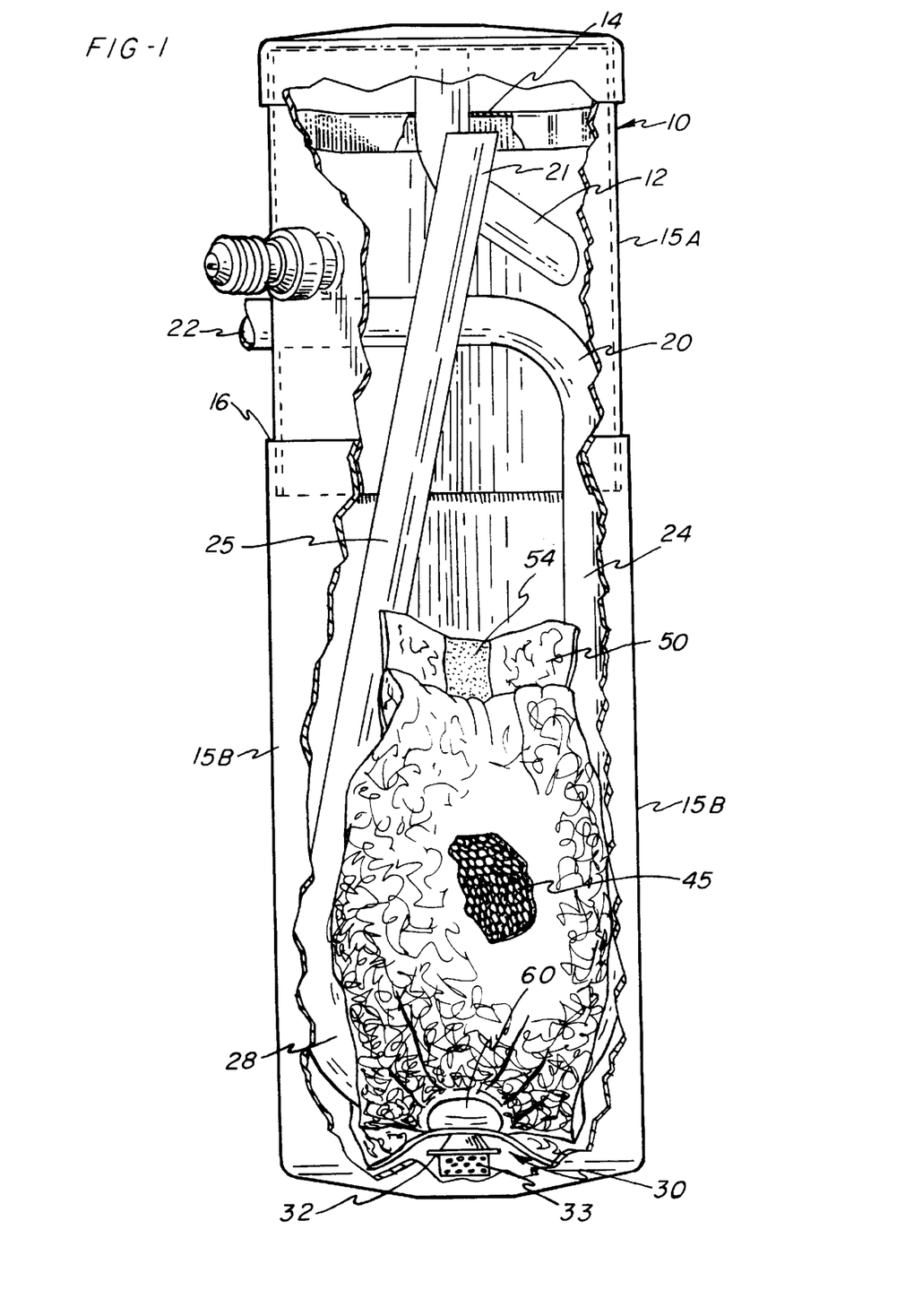
FIG. 1 is a broken away view of an accumulator incorporating an adsorbent material container package in accordance with this invention.

Referring to the drawing FIGS. 1–6, which illustrate a preferred embodiment of the invention, and referring first specifically to FIG. 1, a liquid accumulator for use on air conditioning systems, particularly air conditioning systems used in the automotive field, is illustrated generally at 10. The broken away view of the accumulator 10 shows that it is formed with the usual inlet conduit 12 leading to a distributor or deflector 14 in the upper end of the cylindrical housing 15. The housing 15 includes an upper portion 15a and a lower portion 15b which are joined together to form a sealed canister, about a seam 16, which is brazed closed in the assembly process.

The canister 10 also includes an outlet or suction tube 20 which is bent or formed in a general U-shape within the canister body 15. The tube 20 has an open upper end 21 opening into the top of the canister for withdrawal of refrigerant gasses therethrough, and an outlet end 22 leading to the suction side of the compressor, all in the conventional manner.

The suction tube 20 is formed with a pair of generally parallel upwardly extending leg portions 24 and 25 which are mutually connected by a bottom bight portion 28. The bleed opening, in the case of the accumulator 10, is in the form of a nipple 30 in the shape of an inverted funnel, having a peripheral flange 32 spaced from the bottom most portion of the bight portion 28, and terminating in a filter screen 33. The nipple 30 and its screen 33 are positioned in close proximity to the bottom of the canister body 15b for efficiently picking up lubricating oil for delivery to the compressor components through the suction line 12.

In the manufacture and assembly of the accumulators 10, the bottom half 15b of the body is assembled last, after an adsorbent package has been installed. This condition is best illustrated in FIG. 2, and in FIG. 6 which shows the unassembled accumulator in an inverted position.

Figure 2:
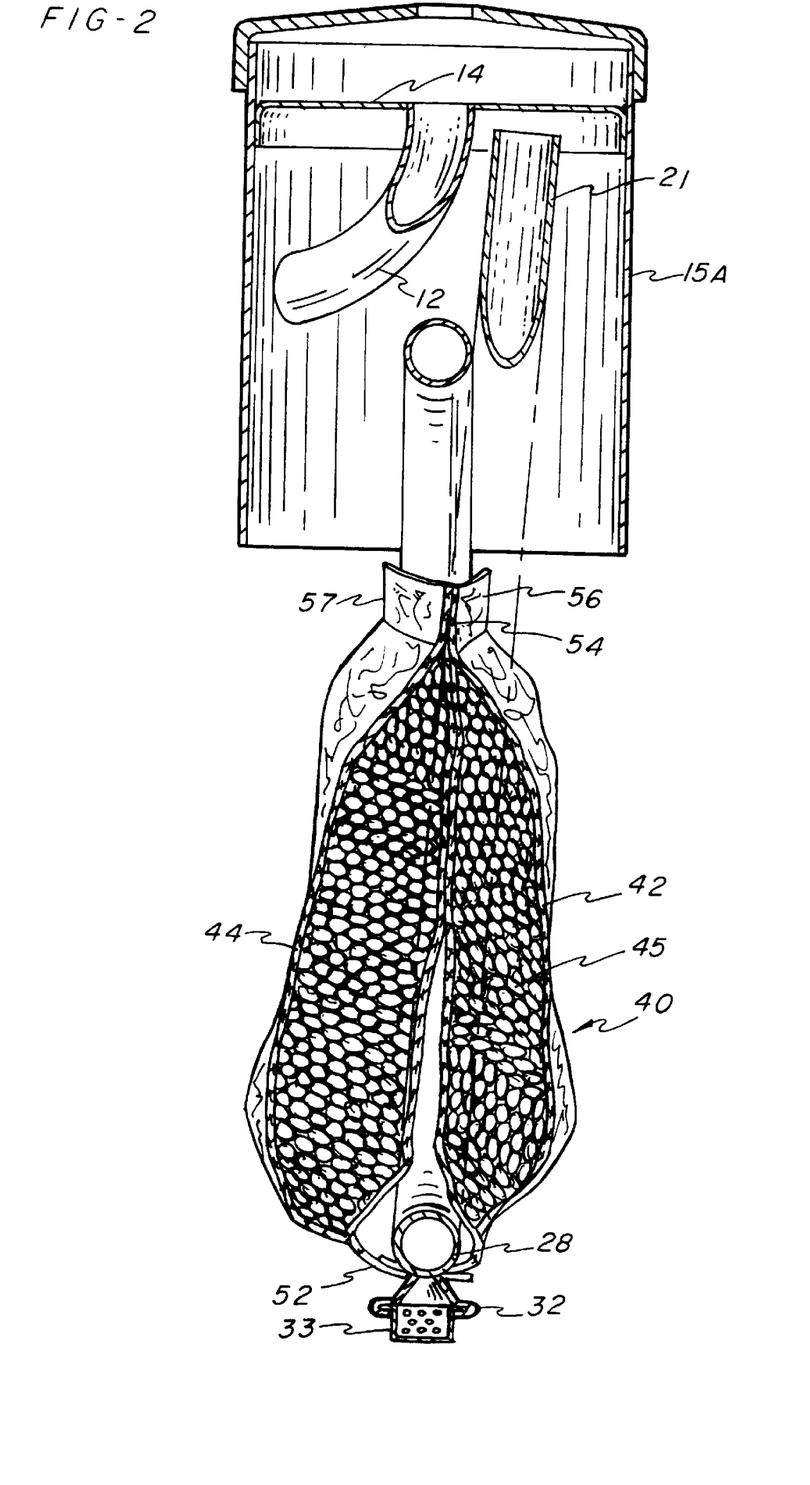
FIG. 2 is a view similar to FIG. 1 in which the bottom half of the accumulator has been removed for the purpose of clarity and viewing the package orthogonally from that shown in FIG. 1.
Figure 3:
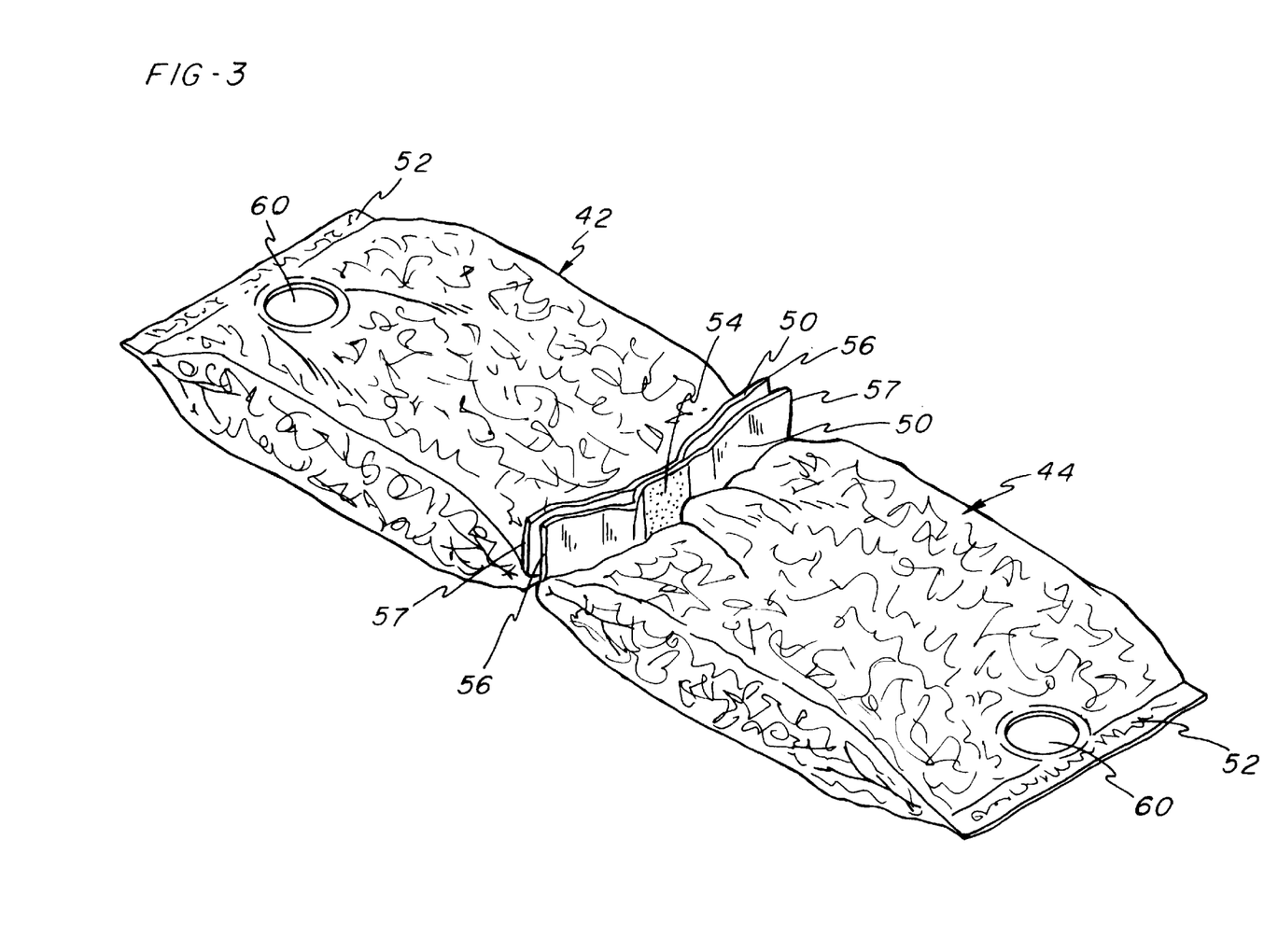
FIG. 3 is a perspective view of the package of this invention.
Figure 4:
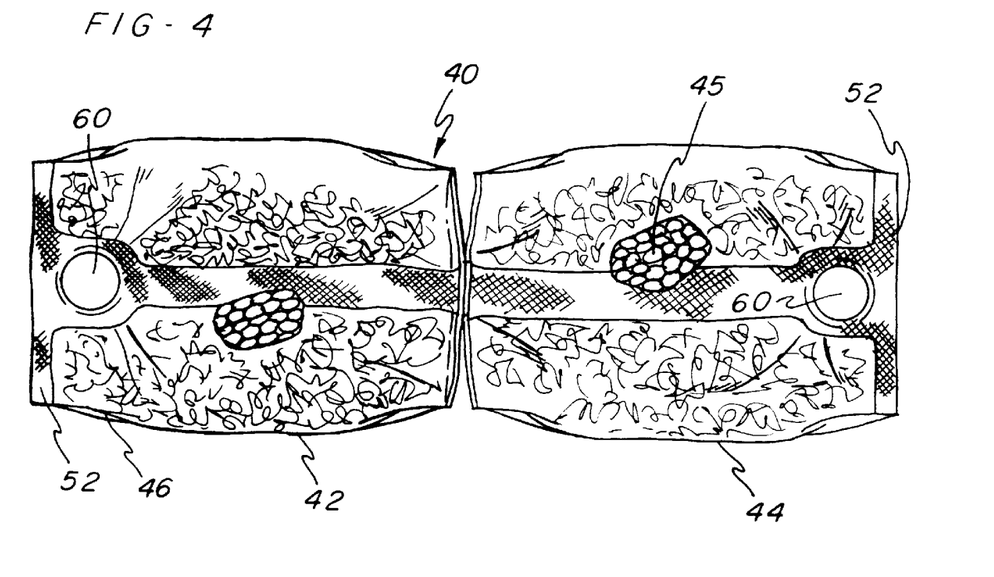
FIG. 4 is a partially cut away plan view looking upwardly along the bottom of the package, in relation to the position of the package in FIG. 3.
Figure 5:
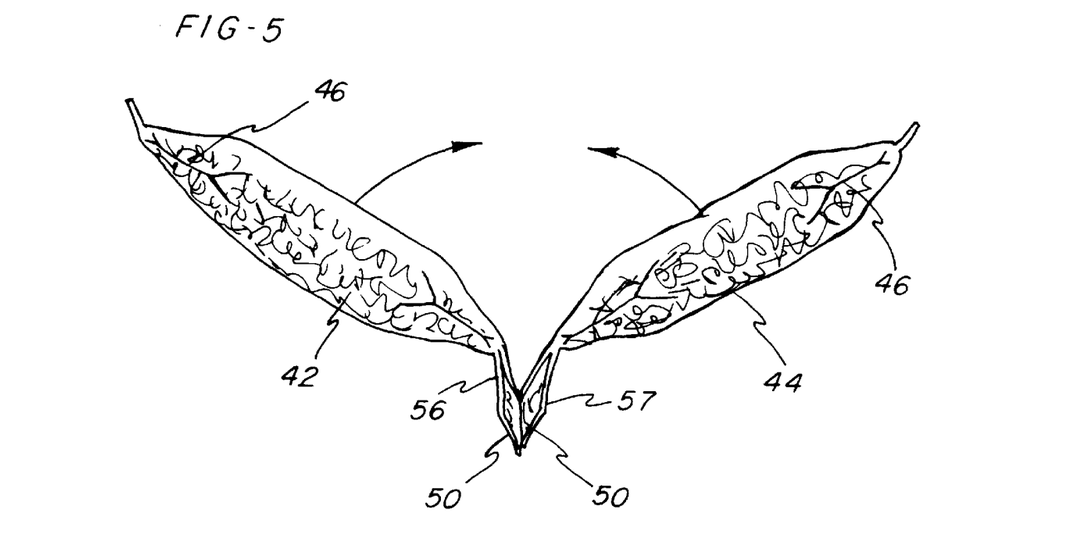
FIG. 5 is a side view of the package showing the pouch portions in a slightly spread-apart position.
Figure 6:
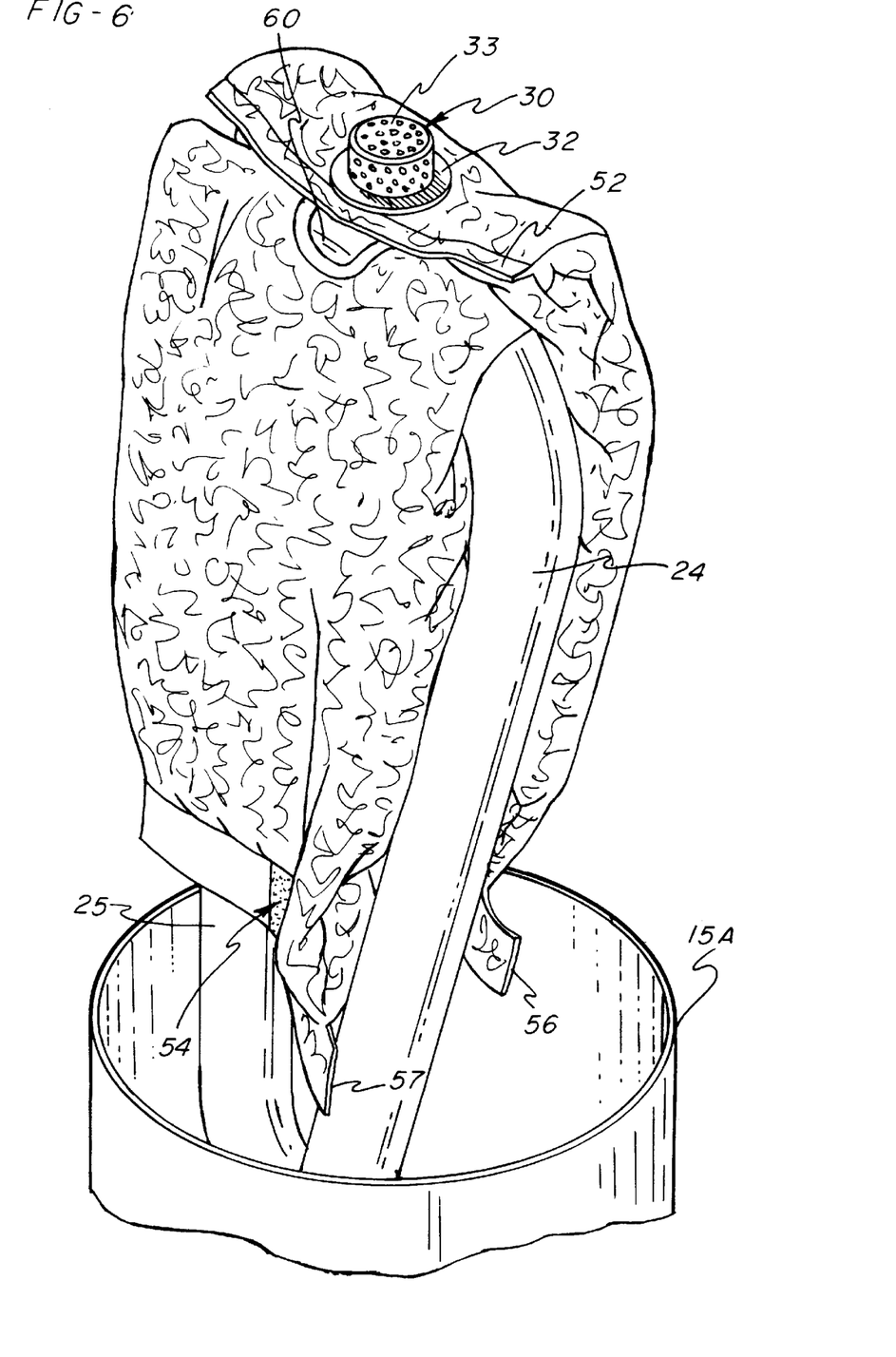
FIG. 6 is an enlarged view of the accumulator, with the bottom closure removed, and shown in inverted form to illustrate the manner of attachment of the adsorbent package over the bleed nipple and also illustrating the manner in which the package is self-holding and locating with respect to the vertical portions of the suction tube.

The improved adsorbent material containing package of this invention is illustrated generally at 40 in FIGS. 3–5 and is shown in its assembled relation on the suction tube 20 in FIGS. 1, 2 and 6.

The adsorbent package principally consists of a pair of substantially identical adsorbent-containing pouches or pouch portions represented by the reference numerals 42 and 44 (see FIG. 2). Each of the pouches is made from a tubular sleeve of polyester porous felt material which has been cut into lengths and filled with appropriate granular adsorbent material 45.

After cutting, a portion of the tubular side walls are tucked in such as represented by the tuck 46 as shown in FIG. 5 and the ends are sealed transversely of the longitudinal direction of the tubular material to form semi-rigid first and second end flanges. While the fused material has a greater rigidity than the unfused polyester felt material, nevertheless it is bendable without breaking and has high strength.

As perhaps best shown in FIGS. 3 and 5, each of the pouches is formed with an upper end flange 50 and a lower end flange 52.

Referring first to the upper flanges 50, these are formed with a width which is at least as great as the spaced apart centers of the vertically extending legs 24 and 25 of the suction tube 20 in the region at which the package 40 is to be positioned and attached. The broken away side elevation of FIG. 1 illustrates the relationship of the end flanges 50 with the legs 24 and 25.

Pairs of the pouches are joined together, to make the package 40, by placing the pouches in a juxtaposition one along side the other, as shown in FIG. 5, and by welding the pouches together at their respective flanges 50. This weld 54 is limited in transverse width and is on a median line with respect to the longitudinal length of the pouches (FIG. 3). By limiting the weld 54 to a transverse central region, the lateral end portions 56 and 57 of the flanges 50 are free of attachment to each other. The weld 54 provides the only physical attachment between the pouches and the pouches are free to bend or be folded about their attached end flanges 50.

The flanges 52 which close the lower ends of the pouches form or define an integral sealed aperture 60. The apertures 60 are each proportioned to be threaded over the diameter of the nipple flange 32 and come to rest on the neck of the nipple and adjacent the bite 28. This assembled position of each of the pouch ends 52 over the bleed nipple 30 is best illustrated in the inverted view of FIG. 6.

When the pouches are so assembled, the major portion of the pouch bodies extend along and between the suction tube leg portions 24 and 25. In this position, the weld 54 is positioned between these legs while the lateral end portions 56 and 57 are splayed or spread apart to encompass each of the legs therebetween, one on each side. Stated differently, each pair of the laterally opposed end portions 56, 57 define a substantially V-shaped slot with each of the suction tube legs 24, 25 received in one of said slots.

In this manner, the package 40 is securely and safely held in position with the bodies of the pouches secured in relation to each other in the form of the assembled package 40, with their respective lower ends threadably received over the pickup nipple and their upper ends spread apart with the terminal flange ends embracing or straddling the respective legs 24 and 25.

Therefore, the adsorbent material package is self-retaining on the legs of the evaporator tube and the package 40 is restrained and prevented from extraneous movements or movements against the canister wall. An air space is assured between the package 40 and the container walls so that when the canister bottom 15b is assembled and brazed to the top 15a about the seam 16, that there is no risk of thermal injury to the material of the package 40.

The pouch attachment is made without the necessity of using tabs or auxiliary clamps or tie downs. It is a secure attachment and is one which lends itself to easy assembly. No extraneous tales or fastener straps or belts are required.

Figure 7:
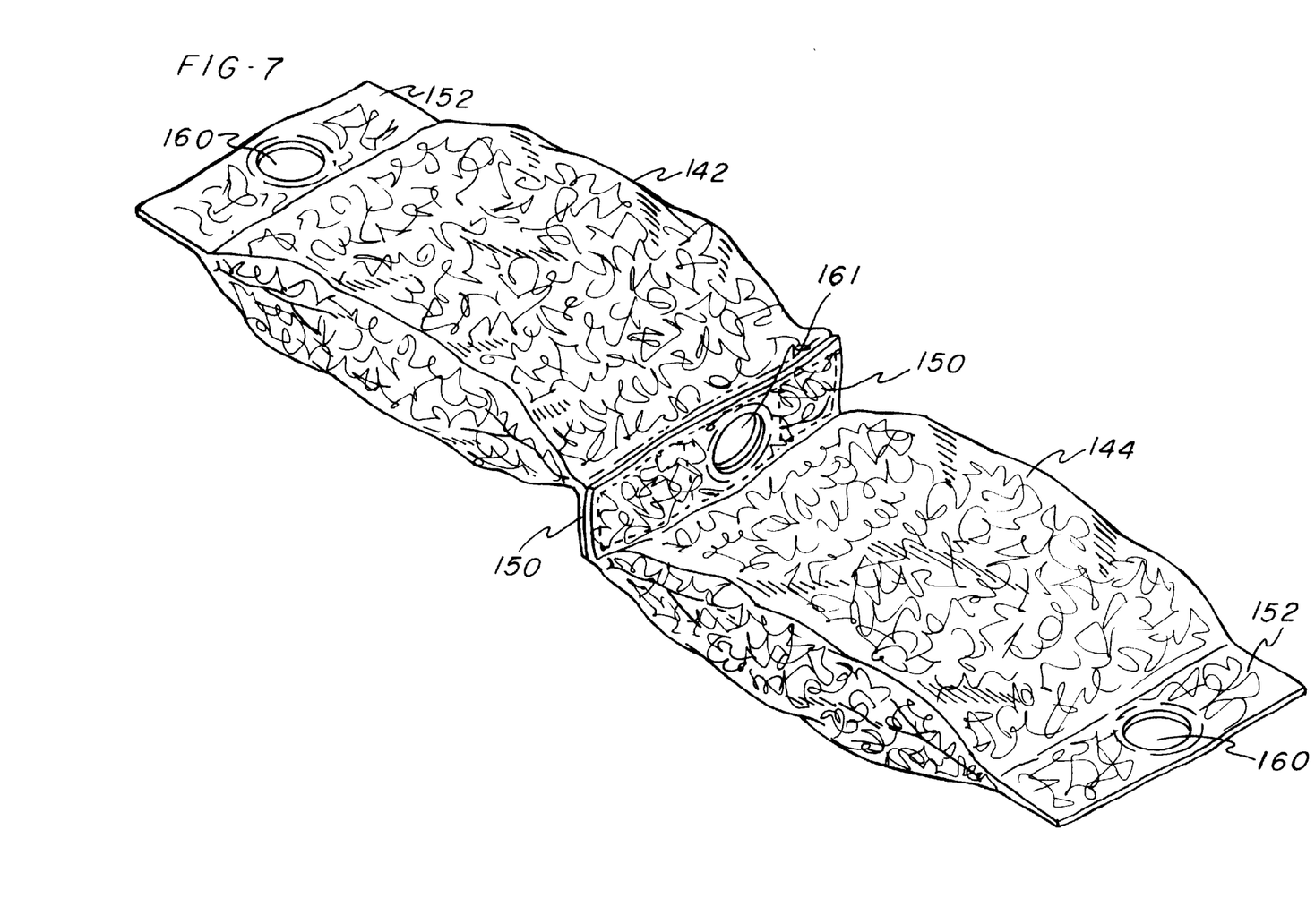
FIG. 7 is a perspective view of another embodiment of an adsorbent material container package in accordance with the invention.

Turning now to FIG. 7, there is shown an alternative embodiment of an adsorbent containing package comprising pouches 142, 144. This embodiment is designed specifically for accumulators or receiver dryers of the type having a single, usually centrally disposed fluid flow tube therein.

Similar to the embodiment shown in FIG. 3, each of the pouches 142, 144 is made from a tubular sleeve of polyester porous felt material that has been cut into desired lengths and filled. Here, the upper flanges 150, 150 of the pouches are joined together along the widthwise direction of the pouches. An aperture 161 is formed in the adjoined flanges 150, 150 intermediate the width of the pouches and is adapted for receipt of an accumulator tube therein as shall be shown more clearly in conjunction with FIG. 8 of the drawings. In all other respects, pouches 142, 144 are structured in conformance with the pouches shown in FIG. 4.

Figure 8:
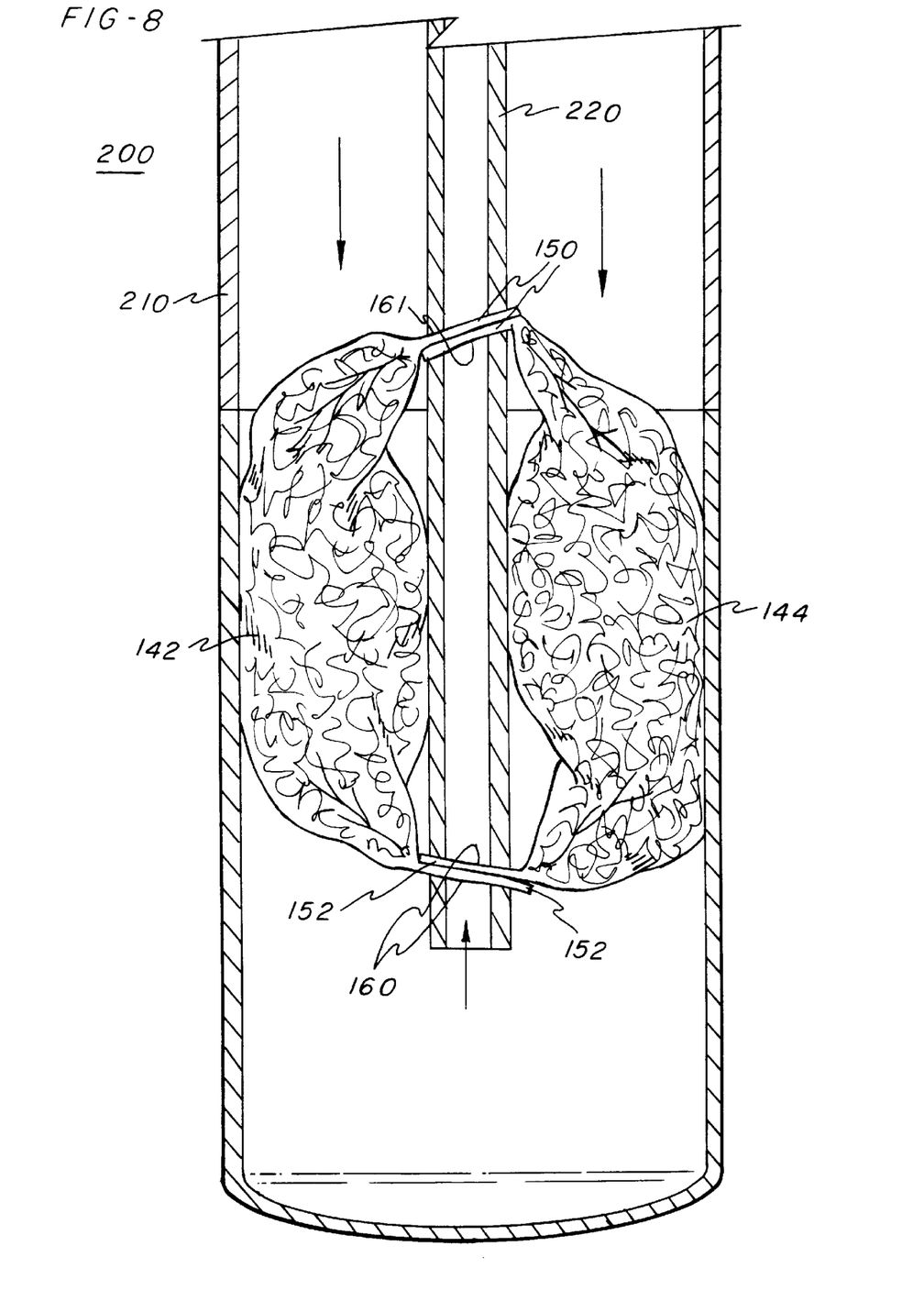
FIG. 8 is a broken away view of another accumulator in combination with the adsorbent material container package shown in FIG. 7.

FIG. 8 shows another accumulator-receiver dryer 200 construction comprising a canister 210 having a single, centrally disposed fluid flow tube 220 therein for communicating with an inlet or outlet line of a refrigeration or air conditioning system. Here, apertures 160, 160 formed in the respective lower flanges 152, 152 of the pouches 142, 144 are superposed in registry with each other and placed over the tube 220. The tube fits through the aperture 161 formed in the adjoined flanges 150. The width of the pouches 142, 144 is dimensioned such that it provides a snug, friction fit within the inner wall of the canister 210.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. An adsorbent containing pouch adapted for positioning within a housing of the type having a fluid flow tube therein, said fluid flow tube comprising a pair of legs connected by a bight tube portion and a filter extending from said bight, said pouch comprising a tubular sleeve of material extending along a longitudinal direction, said sleeve including a first end and a second end spaced from said first end along said longitudinal direction, said first and second ends both sealed in a direction transverse to said longitudinal direction, an adsorbent material filling said sleeve and disposed between said first and second ends, a first aperture formed adjacent said first end and a second aperture formed adjacent said second end, said first and second apertures adapted for positioning in registered, overlapping relation over said filter.

2. An adsorbent containing pouch adapted for positioning over a nipple extending from a liquid accumulator tube, said pouch comprising a tubular sleeve of material extending along a longitudinal direction, said sleeve including a first end and a second end spaced from said first end along said longitudinal direction, said first and second ends both sealed in a direction transverse to said longitudinal direction, an adsorbent material filling said sleeve and disposed between said first and second ends, a first aperture formed adjacent said first end and a second aperture formed adjacent said second end, said first and second apertures adapted for positioning in registered, overlapping relation over said nipple.

* * * * *